United States Patent
Lin et al.

(10) Patent No.: US 10,053,557 B2
(45) Date of Patent: *Aug. 21, 2018

(54) LOW WEAR DEBRIS POLYOXYMETHYLENE COMPOSITION AND A RAMP MADE OF SUCH POLYOXYMETHYLENE COMPOSITION SUITABLE FOR VARIOUS HDD DESIGNS

(71) Applicant: MIN AIK TECHNOLOGY CO., LTD., Taoyuan (TW)

(72) Inventors: Chi-En Lin, Taoyuan (TW); Jung-Pao Chang, Kaohsiung (TW); Hung-Yu Chi, New Taipei (TW)

(73) Assignee: MIN AIK TECHNOLOGY CO., LTD., Taoyuan (TW)

( * ) Notice: Subject to any disclaimer, the term of this patent is extended or adjusted under 35 U.S.C. 154(b) by 135 days.

This patent is subject to a terminal disclaimer.

(21) Appl. No.: 15/272,447

(22) Filed: Sep. 22, 2016

(65) Prior Publication Data

US 2018/0079893 A1    Mar. 22, 2018

(51) Int. Cl.
| C08L 59/04 | (2006.01) |
| C08K 13/02 | (2006.01) |
| C08L 59/00 | (2006.01) |
| G11B 5/40 | (2006.01) |
| G11B 5/54 | (2006.01) |

(52) U.S. Cl.
CPC ............... *C08K 13/02* (2013.01); *C08L 59/00* (2013.01); *C08L 59/04* (2013.01); *G11B 5/40* (2013.01); *G11B 5/54* (2013.01)

(58) Field of Classification Search
CPC ...................................................... C08L 59/04
See application file for complete search history.

(56) References Cited

U.S. PATENT DOCUMENTS

| 6,160,686 A | 12/2000 | Albrecht |
| 6,424,501 B1 | 7/2002 | Tsujino |
| 7,088,555 B2 | 8/2006 | Tsukahara |
| 8,759,431 B2 * | 6/2014 | Chang ................. C08K 5/0016 524/284 |
| 2003/0105199 A1 | 6/2003 | Furukawa |
| 2005/0088782 A1 | 4/2005 | Horio |
| 2008/0037175 A1 | 2/2008 | Horio |
| 2012/0238680 A1 * | 9/2012 | Chang ................. C08K 5/0016 524/222 |
| 2016/0096196 A1 | 4/2016 | Papke |

FOREIGN PATENT DOCUMENTS

| CN | 1420142 A | 5/2003 |
| EP | 2371901 | 9/2013 |
| JP | H11339411 | 12/1999 |
| JP | 2001023325 | 1/2001 |
| JP | 2002197820 | 7/2002 |
| JP | 2005-330463 A | 12/2005 |
| JP | 200784604 A | 4/2007 |
| JP | 2008-214471 A | 9/2008 |
| JP | 2010064205 | 3/2010 |
| JP | 2010125014 | 6/2010 |
| JP | 2011208114 A | 10/2011 |
| JP | 201534221 A | 2/2015 |
| JP | 201540301 A | 3/2015 |
| KR | 1020040071752 A | 8/2004 |
| KR | 1020110109773 A | 10/2011 |
| TW | 201132697 A1 | 10/2011 |
| WO | 2016059711 A1 | 4/2016 |

* cited by examiner

*Primary Examiner* — Michael F Pepitone
(74) *Attorney, Agent, or Firm* — Winston Hsu

(57) ABSTRACT

A polyoxymethylene composition includes a polyoxymethylene copolymer with 1,3-dioxolane as a comonomer, a wear resistance agent, a nucleating agent, and an antistatic agent. A ramp is made of the polyoxymethylene composition. The ramp and the polyoxymethylene have excellent low-wear-debris property. The low wear debris polyoxymethylene composition can be used to produce a ramp for many different designs of hard disks, such as PMR (perpendicular recording)+TDMR (Two-Dimensional Magnetic Recording), SMR (Shingled Magnetic Recording), HAMR+ (HAMR (Heat Assisted Magnetic Recording)+SMR+TDMR), BPMR+ (BPMR (Bit Pattern Media Recording)+SMR+TDMR), and helium-filled hard disk.

13 Claims, 1 Drawing Sheet

LOW WEAR DEBRIS POLYOXYMETHYLENE COMPOSITION AND A RAMP MADE OF SUCH POLYOXYMETHYLENE COMPOSITION SUITABLE FOR VARIOUS HDD DESIGNS

BACKGROUND OF THE INVENTION

1. Field of the Invention

The present invention relates generally to a durable polyoxymethylene composition and a ramp made by molding the durable polyoxymethylene composition. In particular, the present invention is directed to a durable polyoxymethylene composition as well as a ramp including a durable polyoxymethylene composition with excellent micro-wear-resistant property and extremely small amount of wear debris under a high humidity and high temperature condition, a low humidity and high temperature condition, a high humidity and high temperature or room temperature condition, or a low humidity and low temperature condition. Therefore, the present invention is applicable to a ramp for various designs of hard disks, such as PMR (perpendicular recording)+ TDMR (Two-Dimensional Magnetic Recording), SMR (Shingled Magnetic Recording), HAMR$^+$ (HAMR (Heat Assisted Magnetic Recording)+SMR+TDMR), BPMR$^+$ (BPMR (Bit Pattern Media Recording)+SMR+TDMR), and helium-filled hard disks.

2. Description of the Prior Art

Polyoxymethylene (POM), also known as polyacetal, is an engineering thermoplastic resin having the properties of high rigidity, low friction and excellent dimensional stability. A typical molding application of polyoxymethylene includes high-performance engineering parts, such as small gears, fasteners, handle, and locking devices. This material is widely used in the automotive and consumer electronics industries.

Recently, attempts have been made to use such polyoxymethylene as material for a ramp in a hard disk drive (HDD). When the read/write head of a hard disk drive is not in a reading and writing motion, the read/write head is held as spaced from a recording media and retracted to the ramp. For example, JP 10-064205 and JP 10-125014 disclose that polyoxymethylene is a suitable material for a ramp. JP 11-339411 lists some materials applied to the ramp, such as copolyester, polyoxymethylene and poly(ether-ether-ketone) (PEEK). JP 2001-23325 discloses some materials of a ramp, such as polyimide, polyoxymethylene, PEEK, 4-hydroxybenzoic acid and 6-hydroxy-2-naphtoic acid (HAHN), liquid crystal polymer (LCP) and PTFE-filled plastic. US 2008/0037175 discloses a ramp including a polyoxymethylene resin and a colorant for a hard disk drive. The ramp has an outgas level of 20 μg/g or less.

Since the tip of the read/write head reciprocated slide in and slide out a ramp, the debris are produced when the tip of the read/write head rubs against the ramp surface. The debris may attach onto the tip of the read/write head, thereby scratching the surface of the disk, and the recorded data can be damaged. Therefore, improving the micro-wear resistance property of polyoxymethylene has become an important task in this field.

To increase the wear-resistant property of the polyoxymethylene, fluorocarbon resin or polyolefin resin may be added. In addition, solid or liquid lubricants may be added to reduce the friction coefficient of the surface.

Further, it has been found that inorganic fillers may increase the surface hardness thereby increase the wear-resistant property of the polyoxymethylene resin. For example, JP 2002-197820 proposed adding inorganic fillers. U.S. Pat. No. 7,088,555 discloses a technique of increasing the surface hardness by adjusting molding parameters.

However, in the particular work environment, the sliding and the wear-resistant property of the polyoxymethylene resin in the aforementioned prior arts are still insufficient to achieve the users' demand. U.S. Pat. No. 8,759,431 discloses an addition of an inorganic filler, a lubricant, a nucleating agent, a stabilizer, an anti-static agent under a high humidity and high temperature condition, or a low humidity and low temperature condition can strengthen the wear-resistant property of the polyoxymethylene resin.

The trend in the hard disk drive industry is gradually away from a personal computer to a massive data server of cloud device and a large-capacity portable external hard disk drive having compact size. Thus, some new reliability demands must be met. For example, to reduce erroneous reading and writing due to external impact and vibration, to maintain the stability of the read/write head that is operated at high speeds, to save the correctness of the massive data.

Because the new standard requires the tip of the read/write head reciprocated from 600,000 times increased to 2,000,000 times, the micro-wear resistance property of resin for a ramp should more reduce the wear loss and the amount of debris caused when the tip of the read/write head rubs against the ramp surface. Furthermore, titanium (Ti) and titanium oxide are prohibited to add in the resin to prevent such debris scratching the surface of media thereby damaging the recorded data. Ti-contained material is a common component in a colorant.

Some prior art propose that solid lubricant may be added to polyoxymethylene resin to increase the wear-resistant property of the polyoxymethylene resin. However, delamination or mold deposit often occurs and wear-resistant property is reduced due to low compatibility. Moreover, when liquid lubricant is added to increase the wear-resistant property of the polyoxymethylene resin, it is too lubricated for inject molding. Furthermore, the aforementioned conventional prior arts are unable to meet the new standard of reciprocated 2,000,000 times and prohibited to add Ti-contained material.

SUMMARY OF THE INVENTION

The present invention provides a polyoxymethylene composition having the properties of micro-wear resistance, low wear debris, high mechanical stability, and high injection moldability to overcome problems of aforementioned conventional technologies, and with excellent micro-wear-resistant property and extremely small amount of wear debris under a high humidity and high temperature condition, a low humidity and high temperature condition, a high humidity and high temperature or room temperature condition, or a low humidity and low temperature condition.

The function of micro-wear resistance is to decrease the amount of energy necessary for loading/unloading, and also reduces the wear loss and the amount of debris caused when the lift feature of suspension arm rubs against the ramp surface.

The present invention in one aspect provides a polyoxymethylene composition. The polyoxymethylene composition of the present invention has excellent micro-wear-resistant property to lower the wear debris due to wear loss during the operation. The present invention in another aspect provides a ramp for hard disks produced by molding a polyoxymethylene composition. The polyoxymethylene composition of the present invention exhibits the micro-wear loss of 1 μm maximum wear depth, or exhibits the micro-wear loss less than 10 μm2 wear area, or exhibits a debris attached level of Level 0 under a condition of a load of 2.5 g, reciprocated 2,000,000 times, at a speed of 8 inch/sec and a high temperature and high humidity, or a high temperature and low humidity, or low temperature and low humidity, or room temperature and room humidity.

In one embodiment of the present invention, the condition of high humidity has a relative humidity in a range from 80% to 90%.

In another embodiment of the present invention, the condition of low humidity has a relative humidity in a range from 10% to 20%.

In another embodiment of the present invention, the condition of room humidity has a relative humidity in a range from 40% to 60%.

In one embodiment of the present invention, the condition of high temperature has a temperature in a range from 54° C. to 56° C.

In another embodiment of the present invention, the condition of low temperature has a temperature in a range from 4° C. to 6° C.

In another embodiment of the present invention, the condition of room temperature has a temperature in a range from 15° C. to 35° C.

In one embodiment of the present invention, the polyoxymethylene composition includes:
(A) a polyoxymethylene copolymer of 85 wt % to 95 wt % including 1.0-3.3 wt % of 1,3-dioxolane as a comonomer;
(B) an inorganic wear resistance agent of 0.5 wt % to 3.0 wt %;
(C) an organic wear resistance agent of 0.5 wt % to 5.0 wt %;
(D) a nucleating agent of 0.1 wt % to 3.0 wt %; and
(E) an antistatic agent of 0.5 wt % to 5.0 wt %.

In another embodiment of the present invention, the polyoxymethylene composition includes:
(A) a polyoxymethylene copolymer of 85 wt % to 95 wt % including 1.0-3.3 wt % of 1,3-dioxolane as a comonomer;
(C) an organic wear resistance agent of 0.5 wt % to 5.0 wt %;
(D) a nucleating agent of 0.1 wt % to 3.0 wt %; and
(E) an antistatic agent of 0.5 wt % to 5.0 wt %.

In the polyoxymethylene composition of the present invention, the polyoxymethylene copolymer may have a tensile strength 60-70 Mpa (ISO 527), a flexural strength 70-80 Mpa (ISO 178) and melt flow rate 8-12 g/10 min (ISO 1133).

In the polyoxymethylene composition of the present invention, (B) an inorganic wear resistance agent may be nano-grade zinc oxide particles with an average particle size an average particle size not greater than 100 nm.

In the polyoxymethylene composition of the present invention, (C) an organic wear resistance agent may include (C-1) group including ethoxylated amine, a derivative of ethoxylated amine, triethanolamine monolaurate, a derivative of triethanolamine monolaurate, paraffine-based aklane sulfonate, fatty acid ester, or a derivative of fatty acid ester. For example, the organic wear resistance agent may be Hostastat FA, FE, HS series or Sandin EU series from Clariant. Moreover, (C) an organic wear resistance agent may also include (C-2) group including polyethylene glycol (PEG), also called polyethylene oxide (PEO) or polyoxyethylene (POE), with a molecular weight below 1,000.

In the polyoxymethylene composition of the present invention, (D) a nucleating agent may be at least one of a sodium salt or a calcium salt of montanic acid and of a long chain. For example, the nucleating agent may be Bruggolen P250 from Brueggemann.

In the polyoxymethylene composition of the present invention, (E) an antistatic agent may be a glycerol monostearate.

The polyoxymethylene composition of the present invention may be in a form of pellets of 2 mm by 3 mm dimension or in a form of a hollow column. Pellets are suitable for transport or store, if necessary, and then forming a ramp by molding the pellets.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 is Level 0: extremely small amount of wear debris are attached.

FIG. 2 is Level 1: small amount of wear debris are attached.

FIG. 3 is Level 2: small amount of wear debris are attached ⅓ area of read/write head.

FIG. 4 is Level 3: small amount of wear debris are attached ½ area of read/write head.

FIG. 5 is Level 4: wear debris are attached more than ½ area of read/write head.

DETAILED DESCRIPTION

Figure 1:
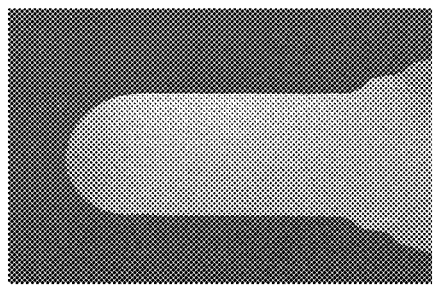
FIG. 1 to FIG. 5 are diagrams illustrating that the debris attached level is defined to five levels according to the amount of wear debris.

The present invention generally relates to a polyoxymethylene composition has excellent micro-wear-resistant property as well as a load/unload ramp structure for hard disks produced by molding the polyoxymethylene composition. A suspension arm holds a read/write head for reading and writing of information from and to an information recording media rotating at a high speed in a hard disk drive. When the read/write head of hard disk drive is not in a reading or writing motion, there is provided a load/unload ramp structure as a retraction location where the read/write head is held as spaced from a recording media, thereby reducing friction and prevents abnormal collision due to external impact.

Recently, the hard disk drive industry continues to develop new technologies in order to break through the capacity limit. However, PMR technology does not have much potential. Conversely, SMR technology has been started to rise. Currently, a single disk with 1.5 TB has been achieved. Next, achievement of a single disk with 2 TB has to rely on HAMR technology which will be published in 2018.

PMR technology is the mainstream for hard disk drive. SMR technology can improve the storage density of 25%, up to 0.95 Tb per square inch, based on PMR technology. Currently, a hard disk drive with 10 TB usually achieves by PMR+SMR technology. A capacity of single disk in PMR hard disk drive is up to 1.5 TB.

However, to improve the capacity of a hard disk drive cannot rely on TDMR technology because to break through the storage density of 1.5 Tb per square inch exists a super magnetic limit so that the data cannot be recorded under a condition of maintained sufficient magnetic field. Therefore, there is a need of HAMR technology to overcome aforementioned problems. HAMR technology heats the magnetic disk through laser thereby producing smaller magnetic unit area. The enhancement of temperature can reduce the size of magnetic particles to produce superparamagnetic critical size, so that the read/write density of disk per unit area is enhanced. A storage density of 2 TB/inch$^2$ will be achieved in 2018 and then will be up to 5 TB/inch$^2$ in the future. Accordingly, storage density will produce an enterprise hard disk drive having a capacity of 40-50 TB (6 disk) and a consumer-grade hard disk drive having a capacity of 25-32 TB. Since a capacity in magnetic density of a hard disk drive need to be enhanced, the reliability and cleanliness of related components are becoming stricter. Therefore, it is necessary to develop a material for a ramp of a hard disk drive having micro-wear-resistant property and extremely small amount of wear debris.

The present invention in a first aspect provides a polyoxymethylene composition. The polyoxymethylene composition of the present invention has excellent micro-wear-resistant property to lower the wear debris due to wear loss during the operation. The present invention in another aspect provides a ramp for hard disks produced by molding a polyoxymethylene composition. The polyoxymethylene composition of the present invention exhibits the micro-wear loss of 1 μm maximum wear depth, or exhibits the micro-wear loss less than 10 μm$^2$ wear area, or exhibits a debris attached level of Level 0 under a condition of a load of 2.5 g, reciprocated 2,000,000 times, at a speed of 8 inch/sec and a high temperature and high humidity.

In one embodiment of the present invention, the condition of high temperature has a temperature in a range from 53° C. to 57° C. and the condition of high humidity has a relative humidity in a range from 80% to 90%.

The present invention in a second aspect provides a polyoxymethylene composition. The polyoxymethylene composition of the present invention has excellent micro-wear-resistant property to lower the wear debris due to wear loss during the operation. The present invention in another aspect provides a ramp for hard disks produced by molding a polyoxymethylene composition. The polyoxymethylene composition of the present invention exhibits the micro-wear loss of 1 μm maximum wear depth, or exhibits the micro-wear loss less than 10 μm$^2$ wear area, or exhibits a debris attached level of Level 0 under a condition of a load of 2.5 g, reciprocated 2,000,000 times, at a speed of 8 inch/sec and a high temperature and low humidity.

In one embodiment of the present invention, the condition of high temperature has a temperature in a range from 53° C. to 57° C. and the condition of low humidity has a relative humidity in a range from 10% to 20%.

The present invention in a third aspect provides a polyoxymethylene composition. The polyoxymethylene composition of the present invention has excellent micro-wear-resistant property to lower the wear debris due to wear loss during the operation. The present invention in another aspect provides a ramp for hard disks produced by molding a polyoxymethylene composition. The polyoxymethylene composition of the present invention exhibits the micro-wear loss of 1 μm maximum wear depth, or exhibits the micro-wear loss less than 10 μm$^2$ wear area, or exhibits a debris attached level of Level 0 under a condition of a load of 2.5 g, reciprocated 2,000,000 times, at a speed of 8 inch/sec and a low temperature and low humidity.

In one embodiment of the present invention, the condition of low temperature has a temperature in a range from 3° C. to 7° C. and the condition of low humidity has a relative humidity in a range from 10% to 20%.

The present invention in a third aspect provides a polyoxymethylene composition. The polyoxymethylene composition of the present invention has an excellent micro-wear-resistant property to lower the wear debris due to wear loss during the operation. The present invention in another aspect provides a ramp for hard disks produced by molding a polyoxymethylene composition. The polyoxymethylene composition of the present invention exhibits the micro-wear loss of 1 μm maximum wear depth, or exhibits the micro-wear loss less than 10 μm$^2$ wear area, or exhibits a debris attached level of Level 0 under a condition of a load of 2.5 g, reciprocated 2,000,000 times, at a speed of 8 inch/sec and room temperature and room humidity.

In one embodiment of the present invention, the condition of room temperature has a temperature in a range from 15° C. to 35° C. and the condition of room humidity has a relative humidity in a range from 40% to 60%.

The polyoxymethylene composition of the present invention includes some components, such as (A) a polyoxymethylene copolymer, (B) an inorganic wear resistance agent, (C) an organic wear resistance agent, (D) a nucleating agent and (E) an antistatic agent or (A) a polyoxymethylene copolymer, (C) an organic wear resistance agent, (D) a nucleating agent and (E) an antistatic agent. The polyoxymethylene composition includes the polyoxymethylene copolymer of 80 wt % to 95 wt % including 3.3 wt % of 1,3-dioxolane as a comonomer. For example, the polyoxymethylene copolymer may have a tensile strength 60-70 Mpa (ISO 527), a flexural strength 70-80 Mpa (ISO 178) and melt flow rate 8-12 g/10 min (ISO 1133).

The polyoxymethylene composition of the present invention includes (B) an inorganic wear resistance agent. The inorganic wear resistance agent of the present composition refers to an inorganic material which can improve the wear-resistant property. For example, a suitable inorganic wear resistance agent may be nano-grade zinc oxide particles with an average particle size an average particle size not greater than 100 nm. A preferred content of (B) an inorganic wear resistance agent is in a range from 0.5 wt % to 3.0 wt %.

The polyoxymethylene composition of the present invention includes (C) an organic wear resistance agent. The organic wear resistance agent of the present composition refers to an organic material which can improve the wear-resistant property. For example, a suitable organic wear resistance agent may be (C-1) group including ethoxylated amine, a derivative of ethoxylated amine, triethanolamine monolaurate, a derivative of triethanolamine monolaurate, paraffine-based aklane sulfonate, fatty acid ester, or a derivative of fatty acid ester. For example, the organic wear resistance agent may be Hostastat FA, FE, HS series or Sandin EU series from. Clariant. A preferred content of (C) an organic wear resistance agent including (C-1) group is in a range from 0.5 wt % to 5.0 wt %. The organic wear resistance agent may be (C-2) group including polyethylene glycol (PEG), also called polyethylene oxide (PEO) or polyoxyethylene (POE), with a molecular weight below 1,000. A preferred content of (C) an organic wear resistance agent including (C-2) group is in a range from 0.5 wt % to 5.0 wt %. The chemical structure of (C-1) group of may be covered by the following chemical formulae (1) to (5):

$$R1\text{-}N\text{---}(CH_2CH_2OH)_2 \qquad \text{formula (1)}$$

$$R1-N-(CH_2CH_2OH)_2+(R2-COO)----cation \quad \text{formula (2)}$$

$$R1-COO-R2-N-(CH_2CH_2OH)_2 \quad \text{formula (3)}$$

$$R1-COO-R3-(OH)_2 \quad \text{formula (4)}$$

$$R1-SO_3----cation \quad \text{formula (5)}$$

In formula (1) to (5), R1, R2 and R3 refer to an alkyl group having 1 to 20 carbons, in which any one of hydrogens of alkyl may be substituted with an alcohol group, aldehyde group, acid group, a sulfonic acid group, an aromatic group, or, a hydrocarbon group having an unsaturated bond or cyclic structure.

The polyoxymethylene composition of the present invention includes (D) a nucleating agent. The nucleating agent of the present composition refers to a material which can enhance the microcrystalline speed of polyoxymethylene and increase the surface hardness. For example, the nucleating agent may be Bruggolen P250 from Brueggemann. A preferred content of (D) a nucleating agent is in a range from 0.1 wt % to 3.0 wt %.

The polyoxymethylene composition of the present invention includes (E) an antistatic agent. The antistatic agent of the present composition includes a glycerol monostearate. A preferred content of (E) an antistatic agent is in a range from 0.5 wt % to 5.0 wt %.

Some examples are given here to demonstrate the steps to formulate and to form the micro-wear-resistant and few-amount-of-wear-debris polyoxymethylene composition of the present invention.

Examples 1 to 8

Materials (A) polyoxymethylene copolymer; (B) an inorganic wear resistance agent of nano-grade zinc oxide particles (C) an organic wear resistance agent of (C-1) group including Hostastat FA, FE, HS series or Sandin EU series from Clariant and (C-2) group including polyethylene glycol (PEG); (D) a nucleating agent Bruggolen P250 from Brueggemann; and (E) an antistatic agent glycerol monostearate were well mixed in a high speed vertical mixer for 2 min, in which each ingredient was formulated in accordance with the proportion listed in Table 1. The mixed materials (5 KG) were placed in a raw material tank after mixing.

The mixed materials were fed into a twin screw extruders (y=44 mm) by a feeder. The feeding was set to be 35 kg/hr. The extruder barrel was adjusted to 160-220° C. The vacuum was adjusted to 10-30 cm Hg. The melted composition was cooled and cut to be pellets in the form of 3 mm*3 mm, then dried by a hot blow dryer at 130° C. for 4 hours. The pellets were injected to form ramps of 0.13 g, 11.0× 3.0×8.0 mm each piece and the results are tested and shown in TABLE 1. The ramps were washed in an ultrasonic cleaner (first stage in a 0.5% surfactant VALTRON® DP97031, second to fifth stages in deionized water, 10 mins in each stage). The wet ramps were dried in a cyclone type oven at 85° C. for 10 mins, and then dried in a dry oven at 85° C. for 1 hour. The ramps were subject to various tests. The results were listed in TABLE 2.

Comparative Examples 1 and 2

A raw material, polyoxymethylene resin pellets (DuPont-Derlin 500P) were dried at 100° C. for 4 hrs. The pellets were injected to form ramps of 0.13 g, 11.0×3.0×8.0 mm each piece. The ramps were washed in an ultrasonic cleaner (first stage in a 0.5% surfactant VALTRON® DP97031, second to fifth stages in deionized water, 10 mins in each stage). The wet ramps were dried in a cyclone type oven at 85° C. for 10 mins, and then dried in a dry oven at 85° C. for 1 hour. The ramps were subject to various tests. Comparative Example 2 is according to polyoxymethylene resin pellets (Titan plastics-Titacon DT319C) disclosed in U.S. Pat. No. 8,759,431, in which the polyoxymethylene resin pellets are prepared by a process similar with comparative Examples 1. The results were listed in TABLE 2.

TABLE 1

| | | | EXAMPLE 1- EXAMPLE 3 | | |
|---|---|---|---|---|---|
| | | | 1 | 2 | 3 |
| Ingredients | A: polyoxymethylene or polyoxymethylene copolymer | | 97.5 | 97.0 | 96.0 |
| | B: inorganic wear resistance agent | nano-grade zinc oxide | — | 0.5 | 1.0 |
| | C: organic wear resistance agent C-1 | (1)* | — | — | 0.5 |
| | C-2 | (2)* | — | — | — |
| | D: nucleating agent | Bruggolen P250 | 1.0 | 1.0 | 1.0 |
| | E: antistatic agent | glycerol monostearate | 1.0 | 1.0 | 1.0 |
| Results | Physical properties | melt flow rate (ISO 1133) | 9 | 9 | 8 |
| | Mechanical properties | Tensile strength (ISO 527-1,2) | 60 | 62 | 63 |
| | | Tensility | 30 | 35 | 35 |
| | | Flexural strength (ISO 178) | 80 | 78 | 79 |
| | | Charpy Impact (ISO 179/1eA) | 13 | 15 | 12 |

| | | | EXAMPLE 4- EXAMPLE 6 | | |
|---|---|---|---|---|---|
| | | | 4 | 5 | 6 |
| Ingredients | A: polyoxymethylene or polyoxymethylene copolymer | | 94.5 | 92.5 | 95.0 |
| | B: inorganic wear resistance agent | nano-grade zinc oxide | 2.0 | 3.0 | 2.0 |
| | C: organic wear resistance agent C-1 | (1)* | 1.0 | 2.0 | — |
| | C-2 | (2)* | — | — | 0.5 |
| | D: nucleating agent | Bruggolen P250 | 1.0 | 1.0 | 1.0 |
| | E: antistatic agent | glycerol monostearate | 1.0 | 1.0 | 1.0 |
| Results | Physical properties | melt flow rate (ISO 1133) | 10 | 9 | 10 |
| | Mechanical properties | Tensile strength (ISO 527-1,2) | 61 | 65 | 62 |
| | | Tensility | 34 | 33 | 33 |
| | | Flexural strength (ISO 178) | 78 | 75 | 79 |
| | | Charpy Impact (ISO 179/1eA) | 17 | 16 | 12 |

| | | | EXAMPLE 7- EXAMPLE 8 | |
|---|---|---|---|---|
| | | | 7 | 8 |
| Ingredients | A: polyoxymethylene or polyoxymethylene copolymer | | 94.5 | 94.0 |
| | B: inorganic wear resistance agent | nano-grade zinc oxide | 2.0 | — |

TABLE 1-continued

| | | | | |
|---|---|---|---|---|
| C: organic wear resistance agent C-1 | (1)* | — | — | |
| C-2 | (2)* | 1.0 | 1.5 | |
| D: nucleating agent | Bruggolen P250 | 1.0 | 1.0 | |
| E: antistatic agent | glycerol monostearate | 1.0 | 1.0 | |
| Results Physical properties | melt flow rate (ISO 1133) | 9 | 11 | |
| Mechanical properties | Tensile strength (ISO 527-1,2) | 62 | 60 | |
| | Tensility | 33 | 35 | |
| | Flexural strength (ISO 178) | 80 | 75 | |
| | Charpy Impact (ISO 179/1eA) | 12 | 13 | |

Remarks:
(1)* an organic wear resistance agent of (C-1) group may be ethoxylated amine, a derivative of ethoxylated amine, triethanolamine monolaurate, a derivative of triethanolamine monolaurate, paraffine-based aklane sulfonate, fatty acid ester, or a derivative of fatty acid ester.
(2)* an organic wear resistance agent of (C-2) group may be polyethylene glycol (PEG), also called polyethylene oxide (PEO) or polyoxyethylene (POE), with a molecular weight below 1,000.

The following test results are carried out under a condition of after being reciprocated 2,000,000 times and tested by CETR Micro-Tribometer UMT2 (Load/Unload mode) with suspension component:

(1) at a load of 2.5 g;

(2) at a speed of 8 inch/sec;

(3) under an environmental high temperature and high humidity; or (4) under an environmental high temperature and low humidity; or (5) under an environmental low temperature and low humidity; or (4) under an environmental room temperature and room humidity.

Figure 2:
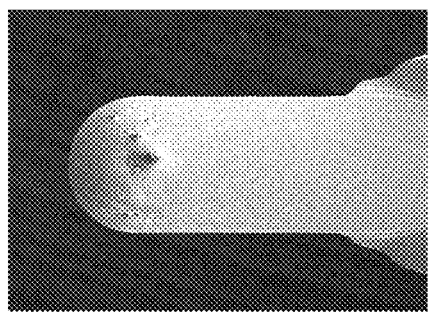
Figure 3:
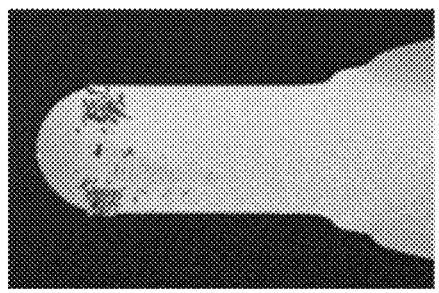
Figure 4:
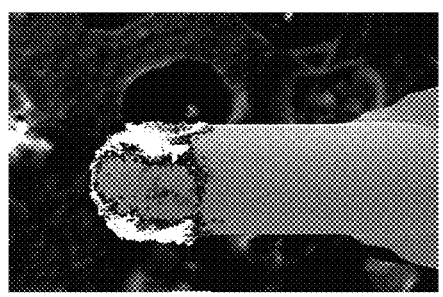
Figure 5:
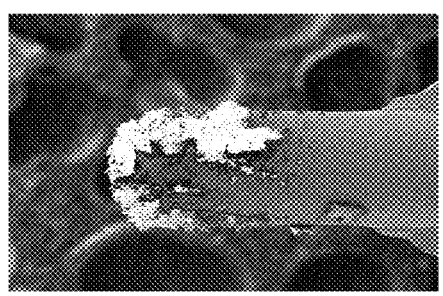

The wear depth and wear area are measured by Talysurf CCI Lite 3D white light interferometer. A debris attached level is observed by SEM scanning electron microscope, in which the debris attached level is defined to five levels according to the amount of wear debris. The test results were listed in TABLE 2. The five debris attached levels are shown in FIG. 1 to FIG. 5.

TABLE 2

| | Example 1 | Example 2 | Example 3 | Example 4 | Example 5 | Example 6 |
|---|---|---|---|---|---|---|
| Temperature Condition | 55° C. ± 2° C. | | | | | |
| Humidity Condition | 85% ± 5% (relative humidity) | | | | | |
| Maximum wear depth (μm) | 197.0162 | 74.9638 | 11.7925 | 5.3740 | 9.8177 | 17.8419 |
| | 110.4021 | 44.1038 | 13.7417 | 6.6765 | 7.3090 | 18.1693 |
| | 184.8204 | 106.4682 | 16.5828 | 5.1339 | 6.0946 | 13.9844 |
| | 259.6340 | 83.8538 | 14.3441 | 5.8706 | 9.5216 | 13.3648 |
| Wear area (μm²) | 3.5041 | 1.5000 | 0.5187 | 0.3931 | 0.4101 | 0.7288 |
| | 1.8046 | 1.1643 | 0.6380 | 0.4008 | 0.3836 | 0.6635 |
| | 3.3411 | 1.9323 | 0.7688 | 0.3554 | 0.4963 | 0.6324 |
| | 3.7293 | 1.3390 | 0.6081 | 0.3364 | 0.5398 | 0.5970 |
| Debris attached level | Level 4 | Level 3 | Level 1 | Level 0 | Level 1 | Level 2 |

| | Example 7 | Example 8 | Comparative Example 1 | Comparative Example 2 |
|---|---|---|---|---|
| Temperature Condition | 55° C. ± 2° C. | | | |
| Humidity Condition | 85% ± 5% (relative humidity) | | | |
| Maximum wear depth (μm) | 7.1406 | 7.4698 | 852.3010 | 42.9686 |
| | 5.7287 | 7.5018 | 420.1518 | 43.9035 |
| | 5.4585 | 6.2052 | 354.4559 | 36.9684 |
| | 9.0122 | 7.1069 | 555.5380 | 40.2951 |
| Wear area (μm²) | 0.3549 | 0.4440 | 7.1324 | 0.9626 |
| | 0.2308 | 0.3251 | 4.2757 | 1.1718 |
| | 0.3612 | 0.3011 | 4.0807 | 1.2942 |
| | 0.5409 | 0.4014 | 5.3487 | 0.9378 |
| Debris attached level | Level 0 | Level 0 | Level 4 | Level 3 |

| | Example 1 | Example 2 | Example 3 | Example 4 | Example 5 | Example 6 |
|---|---|---|---|---|---|---|
| Temperature Condition | 55° C. ± 2° C. | | | | | |
| Humidity Condition | 15% ± 5% (relative humidity) | | | | | |
| Maximum wear depth (μm) | 154.9834 | 61.2433 | 13.1077 | 5.3590 | 9.9739 | 19.1036 |
| | 160.1066 | 79.9931 | 12.8617 | 6.0263 | 8.1984 | 14.4441 |
| | 121.4125 | 88.2720 | 18.9053 | 6.6329 | 10.9018 | 17.4647 |
| | 144.3531 | 90.2828 | 19.9485 | 6.5137 | 8.3280 | 11.6143 |
| Wear area (μm²) | 3.0442 | 1.4737 | 0.6553 | 0.3448 | 0.5036 | 0.7561 |
| | 3.3608 | 2.1395 | 0.5478 | 0.3589 | 0.4042 | 0.5332 |
| | 2.6945 | 2.1917 | 0.6698 | 0.4307 | 0.5460 | 0.5721 |

TABLE 2-continued

| | | | | | | |
|---|---|---|---|---|---|---|
| | 2.9133 | 2.1901 | 0.7267 | 0.3742 | 0.4022 | 0.4757 |
| Debris attached level | Level 4 | Level 3 | Level 2 | Level 0 | Level 2 | Level 1 |

| | Example 7 | Example 8 | Comparative Example 1 | Comparative Example 2 |
|---|---|---|---|---|
| Temperature Condition | | 55° C. ± 2° C. | | |
| Humidity Condition | | 15% ± 5% (relative humidity) | | |
| Maximum wear depth (μm) | 4.4162 | 6.4857 | 132.9531 | 47.0733 |
| | 3.9454 | 5.7082 | 142.1344 | 46.1291 |
| | 2.1007 | 6.3863 | 89.3442 | 41.4518 |
| | 3.5322 | 4.9416 | 90.2828 | 30.0778 |
| Wear area (μm²) | 0.2144 | 0.2381 | 2.2175 | 1.3564 |
| | 0.2131 | 0.2144 | 2.9879 | 1.3853 |
| | 0.1736 | 0.3089 | 2.1901 | 1.0083 |
| | 0.1948 | 0.2285 | 2.0108 | 0.9163 |
| Debris attached level | Level 0 | Level 0 | Level 4 | Level 3 |

| | Example 1 | Example 2 | Example 3 | Example 4 | Example 5 | Example 6 |
|---|---|---|---|---|---|---|
| Temperature Condition | | | 5° C. ± 2° C. | | | |
| Humidity Condition | | | 15% ± 5% (relative humidity) | | | |
| Maximum wear depth (μm) | 105.5127 | 67.6165 | 12.0943 | 3.7991 | 9.1191 | 25.0240 |
| | 96.0454 | 85.4179 | 8.5948 | 4.8985 | 8.0142 | 18.5565 |
| | 112.8209 | 67.5665 | 10.5966 | 5.1154 | 9.3028 | 27.5260 |
| | 127.2750 | 64.6891 | 11.9234 | 4.3194 | 10.4731 | 16.7173 |
| Wear area (μm²) | 1.7530 | 1.1743 | 0.6439 | 0.2930 | 0.5800 | 0.7691 |
| | 0.9626 | 1.5144 | 0.5797 | 0.2153 | 0.4997 | 0.5632 |
| | 1.8339 | 1.1554 | 0.4778 | 0.2110 | 0.6184 | 0.8083 |
| | 2.2391 | 1.3466 | 0.7217 | 0.2742 | 0.6572 | 0.5902 |
| Debris attached level | Level 4 | Level 3 | Level 2 | Level 0 | Level 2 | Level 3 |

| | Example 7 | Example 8 | Comparative Example 1 | Comparative Example 2 |
|---|---|---|---|---|
| Temperature Condition | | 5° C. ± 2° C. | | |
| Humidity Condition | | 15% ± 5% (relative humidity) | | |
| Maximum wear depth (μm) | 4.6370 | 4.4664 | 61.2433 | 33.7465 |
| | 4.2077 | 4.5133 | 79.9931 | 20.5760 |
| | 4.5235 | 3.7991 | 88.2720 | 31.3892 |
| | 6.0024 | 4.5072 | 41.4518 | 33.4614 |
| Wear area (μm²) | 0.2572 | 0.2107 | 1.4737 | 1.2550 |
| | 0.3613 | 0.2417 | 2.1395 | 0.8102 |
| | 0.3239 | 0.3129 | 2.1917 | 1.1303 |
| | 0.3794 | 0.3056 | 1.0083 | 0.9259 |
| Debris attached level | Level 0 | Level 0 | Level 4 | Level 3 |

| | Example 1 | Example 2 | Example 3 | Example 4 | Example 5 | Example 6 |
|---|---|---|---|---|---|---|
| Temperature Condition | | | 25° C. ± 10° C. | | | |
| Humidity Condition | | | 50% ± 10% (relative humidity) | | | |
| Maximum wear depth (μm) | 168.0895 | 50.4602 | 11.0255 | 4.1731 | 8.7666 | 15.7839 |
| | 131.6465 | 68.8131 | 12.3226 | 5.0003 | 9.0734 | 11.3150 |
| | 117.3111 | 47.0733 | 10.7650 | 4.2105 | 10.3012 | 14.7618 |
| | 126.7251 | 46.1291 | 12.74498 | 4.4126 | 11.4355 | 15.6735 |
| Wear area (μm²) | 2.8553 | 1.4430 | 0.5275 | 0.2170 | 0.3760 | 0.5299 |
| | 2.1502 | 1.7166 | 0.6572 | 0.2878 | 0.4311 | 0.6083 |
| | 1.7741 | 1.3564 | 0.5633 | 0.3182 | 0.4271 | 0.5749 |
| | 1.8902 | 1.3853 | 0.6411 | 0.3501 | 0.4627 | 0.5170 |
| Debris attached level | Level 4 | Level 3 | Level 2 | Level 0 | Level 1 | Level 2 |

| | | | Comparative | Comparative |
|---|---|---|---|---|

TABLE 2-continued

|  | Example 7 | Example 8 | Example 1 | Example 2 |
|---|---|---|---|---|
| Temperature Condition | 25° C. ± 10° C. | | | |
| Humidity Condition | 50% ± 10% (relative humidity) | | | |
| Maximum wear depth (μm) | 3.4213 | 3.2242 | 67.5665 | 30.0143 |
| | 3.1268 | 2.2121 | 85.4179 | 28.0361 |
| | 3.2327 | 3.4097 | 117.3111 | 29.3468 |
| | 4.2111 | 4.1362 | 105.5127 | 26.4352 |
| Wear area (μm$^2$) | 0.2265 | 0.1706 | 1.1554 | 0.9252 |
| | 0.3226 | 0.2292 | 1.5144 | 0.8937 |
| | 0.2582 | 0.2478 | 1.8902 | 1.1012 |
| | 0.3188 | 0.2349 | 1.6080 | 0.9083 |
| Debris attached level | Level 0 | Level 0 | Level 4 | Level 3 |

Remarks:
1. 55° C. ± 2° C. and relative humidity of 85% ± 5% refer to a condition of high temperature and high humidity; 55° C. ± 2° C. and relative humidity of 15% ± 5% refer to a condition of high temperature and low humidity; 5° C. ± 2° C. and relative humidity of 15% ± 5% refer to a condition of low temperature and low humidity; 25° C. ± 10° C. and relative humidity of 50% ± 10% refer to a condition of room temperature and room humidity.
2. The data was measured by Talysurf CCI Lite 3D white light interferometer (Different machine might have different test results).
3. SEM scanning electron microscope is from ZEISS ZIGMA.

Example 1 demonstrates a primary evaluation of the polyoxymethylene composition of the present invention not including (B) inorganic wear resistance agent and (C) organic wear resistance agent. Examples 2-8 are further modified and improved in accordance with Example 1. Addition of (B) inorganic wear resistance agent improves micro-wear-resistant properties of the polyoxymethylene composition. The polyoxymethylene composition including (B) inorganic wear resistance agent and (C) organic wear resistance agent have better micro-wear-resistant properties. The polyoxymethylene composition including (C) organic wear resistance agent without (B) inorganic wear resistance agent also have well micro-wear-resistant properties. Examples 4, 7 and 8 demonstrate excellent micro-wear-resistant properties under a condition of high temperature and high humidity, high temperature and low humidity, low temperature and low humidity, or room temperature and room humidity. Examples 4, 7 and 8 also generate least wear debris to show excellent micro-wear-resistant properties under a condition of high temperature and high humidity, high temperature and low humidity, low temperature and low humidity, or room temperature and room humidity. According to results shown is TABLE 2, Examples 4, 7 and 8 demonstrate excellent micro-wear-resistant properties and extremely small amount of wear debris in comparison to the comparative examples.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A polyoxymethylene resin composition, comprising:
a polyoxymethylene copolymer of 85 wt % to 95 wt % comprising 1,3-dioxolane comonomer of 3.3 wt %;
a wear resistance agent of 0.5 wt % to 8.0 wt % comprising an organic wear resistance agent, wherein said organic wear resistance agent comprises polyethylene glycol (PEG) with a molecular weight below 1,000;
a nucleating agent of 0.1 wt % to 3.0 wt %; and
an antistatic agent of 0.5 wt % to 5.0 wt %.

2. The polyoxymethylene resin composition according to claim 1, wherein said wear resistance agent comprises nano-grade zinc oxide particles with an average particle size not greater than 100 nm.

3. The polyoxymethylene resin composition according to claim 1, wherein said antistatic agent comprises glycerol monostearate.

4. A ramp for hard disks produced by molding a polyoxymethylene resin composition according to claim 1.

5. The ramp for hard disks produced by molding a polyoxymethylene resin composition according to claim 4, wherein the ramp has at least one of a micro-wear loss of less than 1 μm maximum wear depth and less than 10 μm$^2$ wear area, or a Level 0 wear debris attach level tested under a condition of a load of 2.5 g after being reciprocated 2,000,000 times at a speed of 8 inch/second.

6. The ramp for hard disks produced by molding a polyoxymethylene resin composition according to claim 5, wherein said ramp is tested under a high humidity and a high temperature.

7. The ramp for hard disks produced by molding a polyoxymethylene resin composition according to claim 6, wherein said high humidity comprises a relative humidity of 85%±5% and said high temperature comprises a temperature of 55° C.±2° C.

8. The ramp for hard disks produced by molding a polyoxymethylene resin composition according to claim 5, wherein said ramp is tested under a low humidity and a high temperature.

9. The ramp for hard disks produced by molding a polyoxymethylene resin composition according to claim 8, wherein said low humidity comprises a relative humidity of 15%±5% and said high temperature comprises a temperature of 55° C.±2° C.

10. The ramp for hard disks produced by molding a polyoxymethylene resin composition according to claim 5, wherein said ramp is tested under a low humidity and a low temperature.

11. The ramp for hard disks produced by molding a polyoxymethylene resin composition according to claim 10, wherein said low humidity comprises a relative humidity of 15%±5% and said low temperature comprises a temperature of 5° C.±2° C.

12. The ramp for hard disks produced by molding a polyoxymethylene resin composition according to claim 5, wherein said ramp is tested under a room humidity and a room temperature.

13. The ramp for hard disks produced by molding a polyoxymethylene resin composition according to claim 12, wherein said room humidity comprises a relative humidity of 50%±10% and said room temperature comprises a temperature of 25° C.±10° C.

* * * * *